United States Patent
Roques

(10) Patent No.: US 7,719,697 B2
(45) Date of Patent: May 18, 2010

(54) PROBE FOR MEASURING THE THICKNESS OF FROST ACCRETION ON A SURFACE

(75) Inventor: Sandrine Roques, Rebigue (FR)

(73) Assignee: Airbus France, Toulouse (FR)

( * ) Notice: Subject to any disclaimer, the term of this patent is extended or adjusted under 35 U.S.C. 154(b) by 285 days.

(21) Appl. No.: 11/817,004

(22) PCT Filed: Feb. 21, 2006

(86) PCT No.: PCT/FR2006/000388
§ 371 (c)(1),
(2), (4) Date: Aug. 23, 2007

(87) PCT Pub. No.: WO2006/092478

PCT Pub. Date: Sep. 8, 2006

(65) Prior Publication Data
US 2008/0278733 A1  Nov. 13, 2008

(30) Foreign Application Priority Data
Feb. 28, 2005  (FR)  ................................. 05 01988

(51) Int. Cl.
*G01B 11/28* (2006.01)
(52) U.S. Cl. ...................................... 356/630; 340/962
(58) Field of Classification Search ......... 356/630–632; 324/671, 699; 62/140, 340, 151; 340/583, 340/962, 146.2, 581
See application file for complete search history.

(56) References Cited

U.S. PATENT DOCUMENTS

| | | | | |
|---|---|---|---|---|
| 4,593,533 A | * | 6/1986 | Alsenz | 62/140 |
| 5,354,015 A | * | 10/1994 | Meador | 244/134 F |
| 5,484,121 A | | 1/1996 | Padawer et al. | |
| 5,874,671 A | | 2/1999 | Lopez | |
| 6,052,056 A | * | 4/2000 | Burns et al. | 340/583 |
| 6,384,611 B1 | * | 5/2002 | Wallace et al. | 324/671 |
| 6,425,286 B1 | | 7/2002 | Anderson et al. | |
| 6,430,996 B1 | * | 8/2002 | Anderson et al. | 73/170.26 |
| 6,762,409 B2 | * | 7/2004 | Fritsch et al. | 250/339.07 |
| 7,439,877 B1 | * | 10/2008 | Jarvinen | 340/962 |
| 7,502,108 B2 | * | 3/2009 | Fritsch et al. | 356/328 |
| 2003/0169186 A1 | * | 9/2003 | Vopat | 340/962 |
| 2007/0080789 A1 | * | 4/2007 | Ikiades et al. | 340/146.2 |
| 2007/0216536 A1 | * | 9/2007 | Alfano et al. | 340/583 |

FOREIGN PATENT DOCUMENTS

DE  2936201  4/1981
EP  1466827  10/2004

OTHER PUBLICATIONS

PCT International Search Report dated Jun. 6, 2006 with English translation.

* cited by examiner

*Primary Examiner*—Hoa Q Pham
(74) *Attorney, Agent, or Firm*—Dickinson Wright PLLC

(57) ABSTRACT

A probe for measuring the thickness of frost accretion on a surface includes a plurality of measuring stages that are stacked substantially orthogonally to the base of the probe. Each measuring stage has an emitter that emits a light beam that is substantially parallel to the base and a receiver that receives the light beam after reflection on the frost.

13 Claims, 3 Drawing Sheets

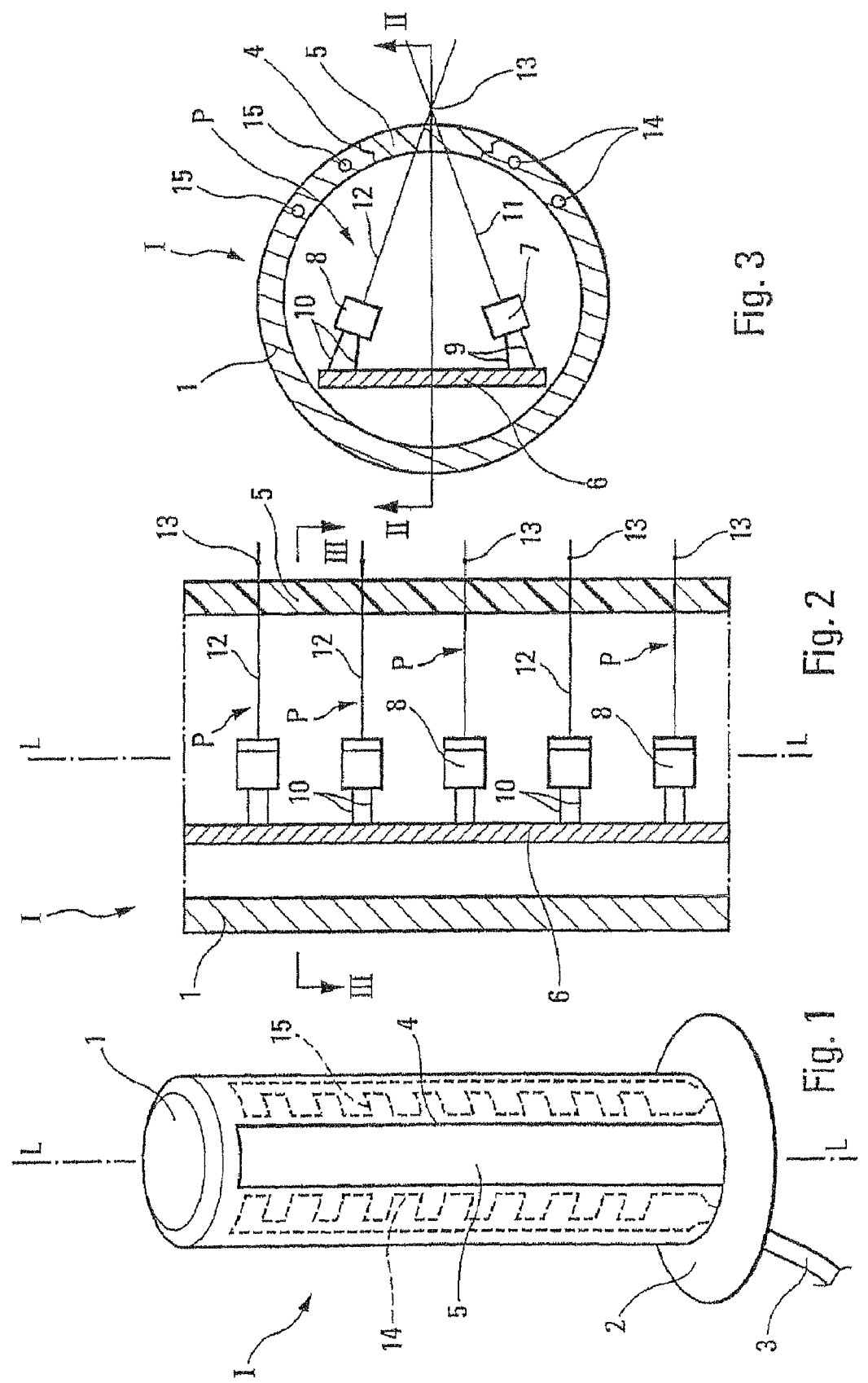

PROBE FOR MEASURING THE THICKNESS OF FROST ACCRETION ON A SURFACE

FIELD OF THE INVENTION

The present invention relates to an optical probe and to a device comprising a plurality of such optical probes for measuring the thickness of an accretion of frost on a surface, in particular an aircraft aerodynamic surface (wing, empennage, etc.).

BACKGROUND OF THE RELATED ART

It is known that, under particular meteorological conditions, accretions of frost may form on the aerodynamic surfaces of an aircraft in flight, thereby, on the one hand, modifying the aerodynamic profile and hence the aerodynamic characteristics of said surfaces and, on the other hand, making said aircraft heavier and modifying the trim thereof. Such accretions of frost may therefore render the aircraft uncontrollable and cause it to drop.

In order to study the meteorological conditions of frost formation and, thus, anticipate accretions of frost on the aerodynamic surfaces of an aircraft and avoid their consequences, specific campaigns of flight trials are conducted. These trials are aimed at improving the knowledge regarding the shapes of the natural accretions of frost that are apt to be laid down so as to validate already existing models, within the framework of the aircraft certification procedure. Thus, they make it possible to define the shapes of the accretions, to measure the thicknesses and spread thereof in particular about the profile of the aerodynamic surfaces and to determine the state of said profile.

As regards solely the measurement of the thickness of frost accretions, numerous probes are already known which operate by implementing physical principles such as electrical induction and propagation of ultrasounds, microwaves and light beams in frost.

For example, document U.S. Pat. No. 6,425,286 describes an electro-optical probe for detecting frost. This probe comprises a base for fixing it to a surface of the aircraft in contact with the aerodynamic flow, as well as an oblong casing, orthogonal to said base and provided with a cavity in which frost can accumulate. A light beam passes through the cavity and a sensor makes it possible to detect or not the presence of said beam. In case of frost, the latter obstructs the cavity so that the light beam may not be detected by the sensor. This probe furthermore comprises a heating device for melting the frost accumulated in the cavity. By counting the number of heating cycles, the probe can evaluate the total quantity of frost formed.

Regardless of the physical principle on which the operation of these known probes is based, experience shows that they can measure only limited thicknesses of frost and, sometimes, with low accuracy.

SUMMARY OF THE INVENTION

One of the objects of the present invention is to remedy this drawback and relates to an optical probe able to accurately measure significant thicknesses of frost (for example some ten centimeters).

To this end, according to the invention, the probe for measuring the thickness of an accretion of frost on a surface, in particular an aircraft aerodynamic surface, said probe being provided with a base able to be applied to said surface, is noteworthy:

in that it comprises a plurality of measurement stages overlaid at least substantially orthogonally to said base; and
in that each measurement stage comprises:
at least one emitter able to emit a light beam at least substantially parallel to said base, and
at least one receiver able to receive said light beam after reflection on said frost.

Thus, the thickness of the frost covering said surface corresponds to the distance separating said base and the last stage whose receiver receives the light beam emitted by the associated emitter, the resolution of the measurement corresponding to the distance separating this last stage and the first stage whose receiver does not receive the light beam emitted by the associated emitter. A scale of measurement of the thickness of frost is thus obtained.

Advantageously, each emitter is of the light-emitting diode type, while each receiver is of the photodiode type.

Preferably, the probe in accordance with the present invention comprises a casing, which is secured to said base and which encloses said plurality of overlaid measurement stages, and in that, at the level of each of said measurement stages, said casing is provided with a transparent window for said light beam. The plurality of said windows may be formed by a porthole common to all the measurement stages.

In an advantageous embodiment, the probe in accordance with the present invention comprises heating means able to superficially melt the accretion of frost, at least in the vicinity of said windows and, preferably, right around said probe. Thus, said probe is divorced from the accretion of frost, thereby avoiding the mechanical stresses exerted by the accretion on the probe, the risk of modification of the deposition of frost by the probe and the risk of variation of the point of emitter-receiver convergence of each stage.

In order to disturb the flow of air in the vicinity of the probe as little as possible during the flight of the aircraft, it is advantageous for said casing to present an oblong shape. Thus, the formation of the accretion of frost is not disturbed and the measurements are reliable. It will be noted that the heating means make it possible to prevent an increase in the drag of the probe, which would be the case if the whole of the latter were to frost over.

Additionally, it will also be noted that, the known probes mentioned hereinabove and also the probe in accordance with the present invention deliver only point measurements of thickness, this being insufficient to study the whole of the profile of an accretion of frost on said surface.

To solve this problem, the prior technique generally implements a plate fixed orthogonally to said surface and carrying a length measurement scale. Each plate, which may present the shape of a portion of a ring when it is fixed to a leading edge, is observed in flight by a camera which is disposed aboard the aircraft and which thus indicates the thickness of frost accumulated along said plate. However, on account of the remoteness of the camera and of the observation of the plate by the latter through a porthole of the aircraft, the measurement may not be good. Moreover, such a measurement device is sensitive to vibrations, thereby impairing the quality of the images—whose resolution is poor—and hence of the measurement.

Hence, another object of the present invention is to remedy this last problem.

To this end, the present invention relates to a device making it possible to determine the thickness of an accretion of frost on a surface, this device being noteworthy in that it comprises a plurality of probes according to the invention distributed over said surface.

When said surface is an aerodynamic surface subject to an aerodynamic flow, it is advantageous to direct the windows of said probes transversely to said aerodynamic flow. One thus avoids falsifying the measurements through the phenomena of a wave and a trough of frost which form respectively ahead of and behind the probe.

Preferably, said device comprises at least one set of probes disposed in the aerodynamic flow (in alignment or offset so as to avoid the masking of a probe by another), and said set of probes surrounds the leading edge of the aerodynamic surface.

Of course, the probes can be fixed directly to the surface on which one wants to measure the thicknesses of frost. However, especially when one wishes not to damage said surface, it is advantageous to fix said probes to a support which is temporarily bonded to said surface, which is parallel to the latter and which leaves an intermediate space with said surface. Such a support is for example described in document U.S. Pat. No. 5,874,671.

BRIEF DESCRIPTION OF THE DRAWINGS

The figures of the appended drawing will elucidate the manner in which the invention may be embodied. In these figures, identical references designate similar elements.

FIG. 1 is a perspective view of an optical probe in accordance with the present invention, viewed from the side of its porthole.

FIG. 2 is a magnified, but partial, axial section of the probe of FIG. 1, said section passing through said porthole and corresponding to the line II-II of FIG. 3.

FIG. 3 is a magnified transverse section of the probe of FIG. 1, said section corresponding to the line III-III of FIG. 2.

DETAILED DESCRIPTION OF THE INVENTION

Figure 4:
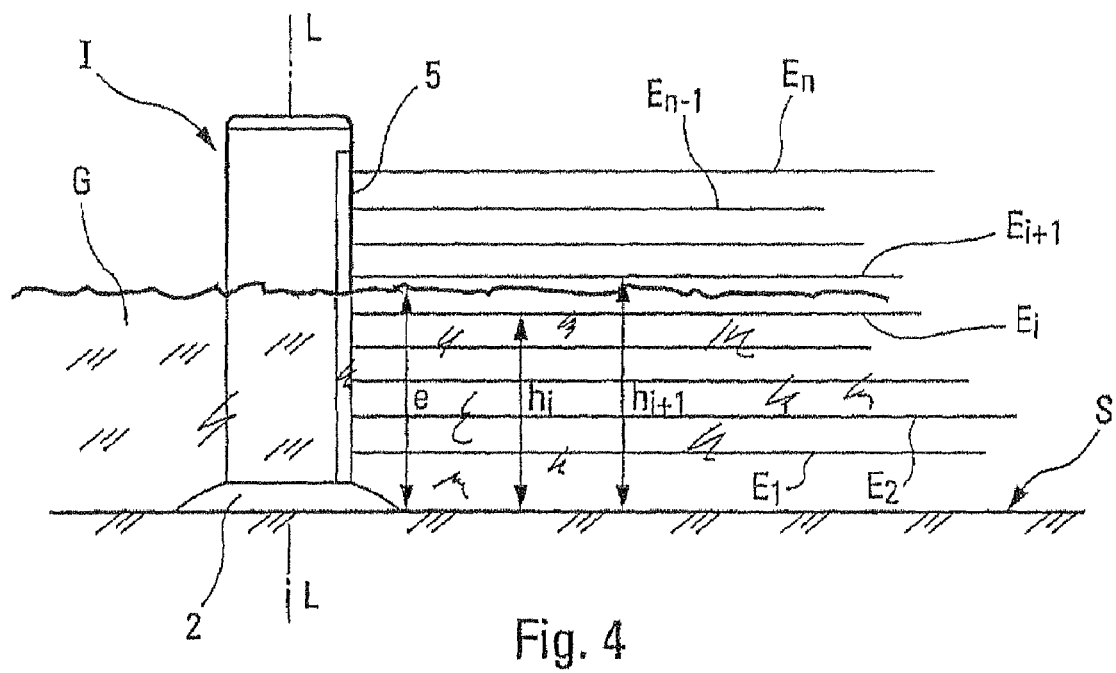
FIG. 4 illustrates the principle of measurement of the optical probe in accordance with the present invention.

The probe I, represented in FIG. 1 by way of exemplary embodiment of the present invention, comprises an oblong casing 1, for example cylindrical, running alongside an axis L-L. At one of its ends, the probe I comprises a base 2 orthogonal to the axis L-L. At least one electric cable 3, passing through the base 2, allows electrical linking of the probe I with the exterior.

A part of the lateral wall of the casing 1 is provided with a longitudinal opening 4, shut off by a longitudinal porthole 5, which is transparent to red or near infrared radiations.

Inside the oblong casing 1 is disposed, longitudinally, a printed circuit board 6, linked electrically to a cable 3 and fixed in any appropriate manner to the interior of said casing, opposite said porthole 5.

The printed circuit board 6 carries a plurality of pairs of optical emitters 7 and of optical receivers 8, distributed along the axis L-L. The emitters 7 and the receivers 8 are fixed to the printed circuit board 6, respectively by their lugs 9 or 10. In each emitter 7/receiver 8 pair, the optical axis 11 of the emitter 7 passes through the porthole 5 and cuts the optical axis 12 of the corresponding receiver 8—which also passes through said porthole 5—at a point of convergence 13 lying on the exterior side of said porthole 5.

The optical emitters 7 are light-emitting diodes emitting in the red or near infrared. The optical receivers 8 are photodiodes sensitive to the same radiations.

The planes P defined by each axis 11 and by each corresponding axis 12 are parallel to one another and, preferably, equidistant from one another. Thus, each emitter 7—receiver 8 pair forms a measurement stage, said measurement stages E1 to En (with n=an integer at least equal to 2) being staggered along the axis L-L, that is to say they are overlaid at least substantially orthogonally to the base 2 (see FIG. 4).

Additionally, the probe I comprises electric heating resistors 14 and 15 that can be supplied with current by way of a cable 3.

As shown by FIG. 4, when an accretion of frost G forms on a surface S, to which a probe I is fixed or applied by its base 2, the receivers 8 of the measurement stages situated under the frost (stages E1 to Ei in the example represented, with i=an integer at most equal to n) receive by reflection on said frost the light beam emitted by the respective emitters 7 and emit a corresponding signal, while the receivers 8 of the measurement stages situated above the frost (stages Ei+1 to En in the present example) may not receive the beam emitted by their associated emitter 7 and therefore remain passive.

It is therefore easy to determine the thickness e of the accretion of frost G, this thickness being greater than the height hi of the last stage Ei whose receiver 8 receives the light beam of the associated emitter 7, but less than the height hi+1 of the first stage Ei+1 whose receiver 8 does not receive the light beam emitted by the associated emitter 7.

During the measurement, the heating resistors 14, 15 make it possible to superficially melt the frost around the probe I.

Figure 5:
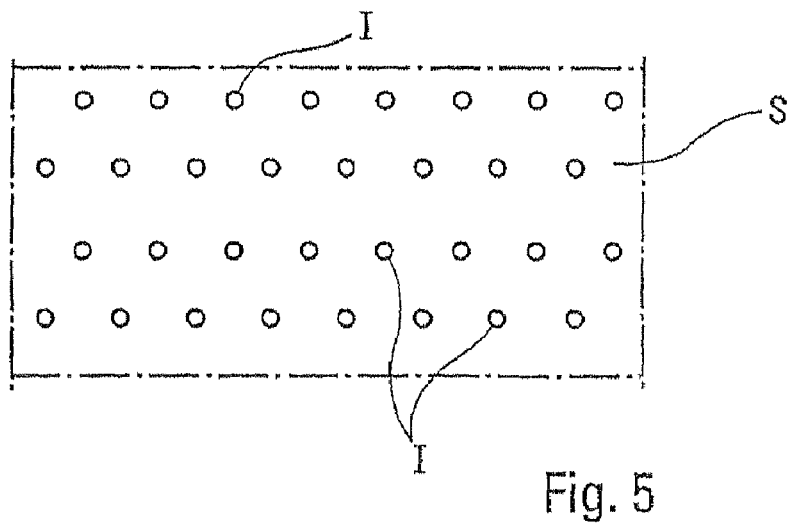
FIG. 5 shows, in plan, an exemplary device comprising a plurality of probes.
Figure 6:
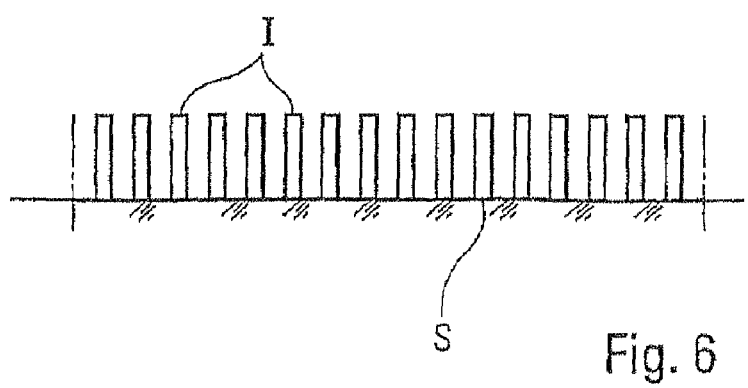
FIG. 6 is a profile view of the device of FIG. 5.

As shown by FIGS. 5 and 6, it is possible to use a plurality of probes I distributed over the surface S to measure the thickness of the accretion of frost G at a plurality of locations of said surface S. It is thus possible to determine the exact shape of this accretion over the surface S.

Figure 7:
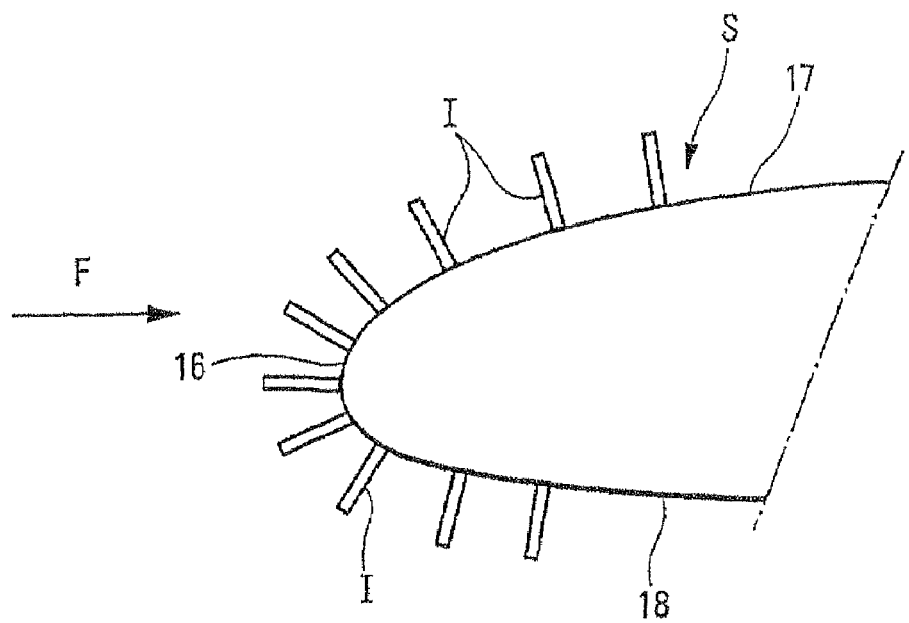
FIG. 7 shows a device according to the invention surrounding the leading edge of an aerodynamic surface.
Figure 8:
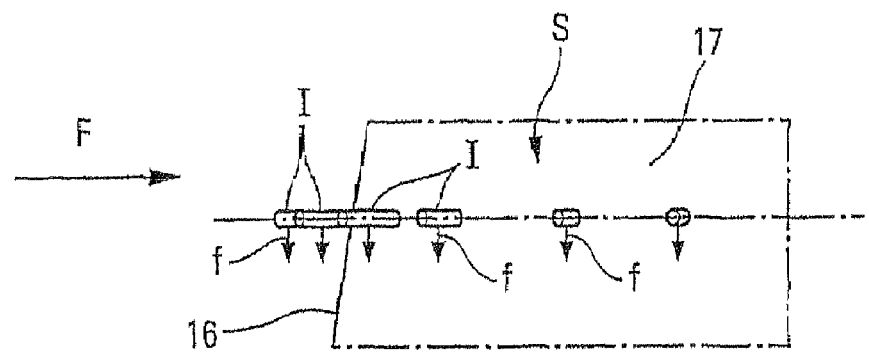
FIG. 8 is a plan view corresponding to FIG. 7.

In the device of FIGS. 7 and 8, the surface S is a portion of an aerodynamic surface comprising a leading edge 16 connecting a topside 17 to an underside 18. The probes I are disposed about the leading edge 16, from the topside 17 to the underside 18. The aerodynamic surface S is subjected to an aerodynamic flow, symbolized by an arrow F, and said probes I are disposed in this aerodynamic flow. Preferably, as indicated hereinabove, the portholes 5 of said probes I are directed transversely to said aerodynamic flow, this being symbolized by the arrows f in FIG. 8.

Figure 9:
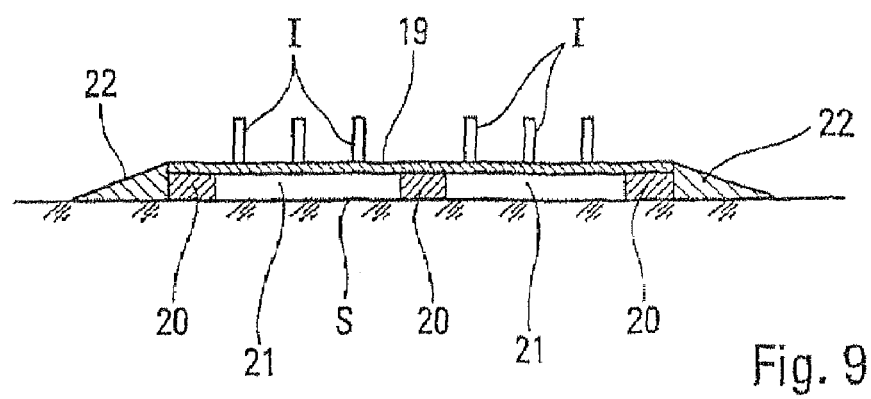
FIG. 9 illustrates a temporary support for the fixing of the probes of the device according to the invention.

In the examples of FIGS. 4 to 8, the probes I are assumed to be fixed to the surface S directly. In FIG. 9, the probes I are fixed to a temporary support 19, itself bonded to the surface S by means of adhesive pads 20, leaving intermediate spaces 21 between the support 19 and the surface S, which spaces are useful for passing the electric cables 3. Progressive transitions 22 may be provided at the periphery of the support 19, between the latter and the surface S.

The invention claimed is:

1. A probe for measuring the thickness of an accretion of frost on an aircraft aerodynamic surface, wherein:
    said probe comprises a plurality of measurement stages overlaid at least substantially orthogonally to said accretion of frost; and
    each measurement stage comprises:
        at least one emitter configured to emit a light beam at least substantially parallel to said accretion of frost, and at least one receiver configured to receive said light beam after reflection on said frost.

2. The probe as claimed in claim 1, wherein said emitters are of the light-emitting diode type.

3. The probe as claimed in claim 1, wherein said receivers are of the photodiode type.

4. The probe as claimed in claim 1, further comprising a casing, which is secured to said base and which encloses said plurality of overlaid measurement stages, and, at the level of each of said measurement stages, said casing is provided with a transparent window for said light beam.

5. The probe as claimed in claim 4, wherein the plurality of said windows is formed by a porthole common to all the measurement stages.

6. The probe as claimed in claim 4, wherein said casing presents an oblong shape.

7. The probe as claimed in claim 4, further comprising a heater configured to superficially melt the accretion of frost in the vicinity of said probe.

8. A device making it possible to determine the thickness of an accretion of frost on a surface, further comprising a plurality of probes as specified under claim 1, said probes being distributed over said surface.

9. The device as claimed in claim 8, intended to determine the thickness and accretion of frost forming on an aerodynamic surface subject to an aerodynamic flow, further comprising a casing, which is secured to said base and which encloses said plurality of overlaid measurement stages, and, at the level of each of said measurement stages, said casing is provided with a transparent window for said light beam, wherein:

said windows of the probes are directed transversely to said aerodynamic flow.

10. The device as claimed in claim 9, further comprising at least one set of probes disposed in the aerodynamic flow.

11. The device as claimed in claim 10, wherein said set of probes surrounds the leading edge of said aerodynamic surface.

12. The device as claimed in claim 8, wherein the bases of said probes are fixed directly to said surface.

13. The device as claimed in claim 8, wherein the bases of said probes are fixed to a support which is temporarily bonded to said surface, which is parallel to the latter and which leaves an intermediate space with said surface.

* * * * *